United States Patent Office 3,279,482
Patented Oct. 18, 1966

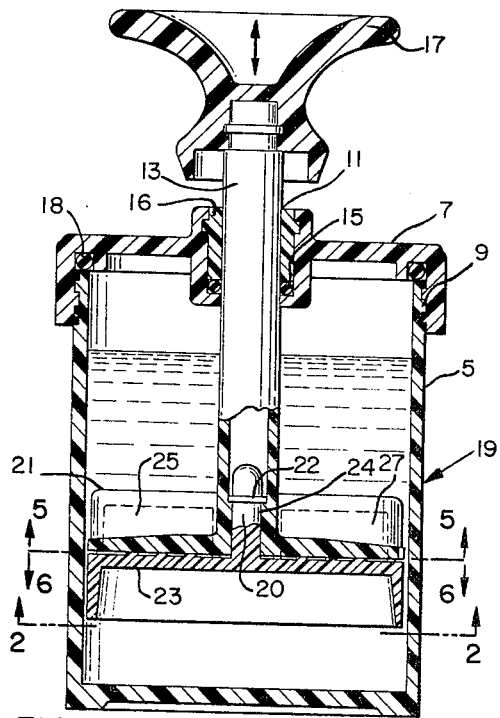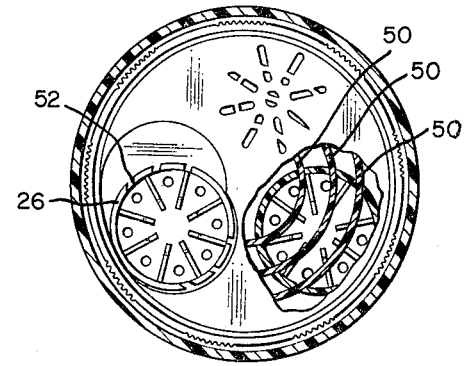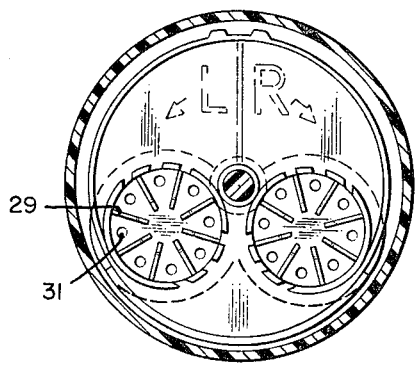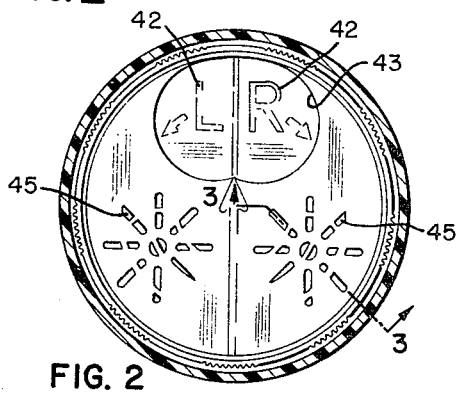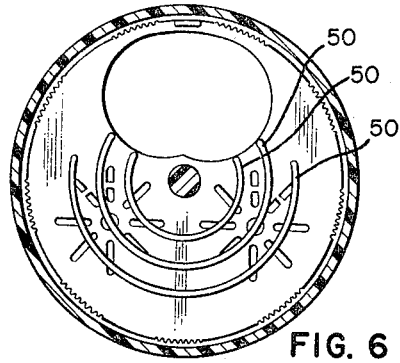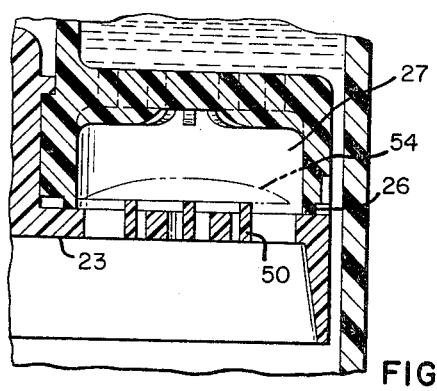
INVENTOR.
RICHARD C. HUNGERFORD
BY FRANK E. BROWN
ATTORNEYS

3,279,482
LENS WASHING MACHINE
Richard C. Hungerford, Sunnyvale, and Frank E. Brown, Burbank, Calif., assignors to Barnes-Hind International, Inc., a corporation of California
Filed Dec. 9, 1964, Ser. No. 417,080
2 Claims. (Cl. 134—145)

This invention relates to a cleansing device, and more particularly, relates to an improvement in the cleansing devices for contact lenses, shown in our prior Patents 3,139,097 and 3,139,098.

In our prior patents we described and claimed lens cleaning devices wherein a composite piston is employed within a vessel containing a cleansing solution, the composite piston having cups for holding the lenses. In each of the structures described and claimed, the composite piston comprised one section having two cups, each of which was adapted to hold a contact lens, and a second section having a substantially flat face, which fit against the cups of the first section, holding the lenses within their respective cups. Although such devices are highly successful in the cleansing of contact lenses, they do suffer from one defect. If the lenses are placed in the cups with the concave side toward the flat section of the piston, there is always the possibility that the lenses will adhere to the flat section. The marginal edges of contact lenses are very thin, and if a lens adheres to the flat section and the two sections of the piston are turned relative to each other, there is the slight possibility that the edge of the lens will wedge between the sections of the piston, and as turning continues, the lens may be cracked.

In accordance with the present invention, a modification of our prior devices is provided which renders it impossible for the lens to wedge between the two sections of the piston.

Generally speaking, the invention is accomplished by providing a plurality of ridges on the otherwise flat section of the composite piston which fit into corresponding grooves in the edges of the lens cups, so that should a lens tend to adhere to the flat section, it will be retained a short distance from the flat surface by the ridges and, upon turning the piston, the lens will be engaged by the side of the lens cup and will be retained within the cup without any possibility of its wedging between the two sections of the piston.

In the drawings forming a part of this application:

FIGURE 1 is a side view of a device embodying the present invention, partly in section.

FIGURE 2 is a sectional view through the device on the lines 2—2 of FIGURE 1.

FIGURE 3 is a partial sectional enlarged view of the device on the lines 3—3 of FIGURE 2.

FIGURE 4 is a bottom view of the piston with one chamber open, and with the area over the opposite chamber broken away.

FIGURE 5 is a top view of the piston on the line 5—5 of FIGURE 1.

FIGURE 6 is a view on the line 6—6 of FIGURE 1.

FIGURE 7 is an enlarged detailed view at the marginal edge of a lens cup showing the relationship between the ridges and the grooves on the cup.

Turning now to a description of the drawings by reference characters, the washing device comprises a cup-like receptacle 5 which is preferably made of a clear plastic such as polypropylene. The device has a cover 7 which is preferably fastened to the cup 5 by means of mating threads 9, although other means of attachment can be used, such as a mating lip and notch, so that the cover may be merely snapped into place. At the center of the cover 7 is a round hole 11 to receive a piston rod 13. Preferably, the hole 11 is provided wth an O-ring 15 to provide a better sealing action. The O-ring may be held in place by a bushing 16. A gasket 18 prevents leakage at the edge of the cover. The piston rod 13 is provided with a handle 17 at its upper end so that it may be easily grasped. Handle 17 is preferably large enough to provide a stable base for the rod and cover assembly when they are removed and inverted. The opposite end of piston rod 13 is provided with a composite piston generally designated 19, which piston is preferably of a soft plastic such as polyethylene or polypropylene so that the danger of scratching the lenses is obviated. The piston 19 comprises an upper disc 21 which is affixed to the rod 13 and a lower disc 23 which is rotatably attached to the rod 13 by a pin 20 which can be integral with the lower disc 23. A collar 22 on pin 20 bearing against shoulder 24 prevents the upper and lower members from separating. Since the pin is made of relatively soft plastic, the device can be assembled merely by pushing the pin 20 into the opening, the parts deforming sufficiently to allow the collar 22 to pass up through the piston rod 13 and engage the shoulder 24.

The upper disc 21 is provided with two lens-receiving cups 25 and 27 each having a closed end and an open end, the latter being substantially flush with the surface of the disc, although the cups may have a small lip 26 extending above the surface. Each of these cups is of sufficient size to receive a contact lens and the closed end of each of the cups is provided with a plurality of ridges 29 so the lens will be held slightly off the bottom of the cup. Thus the area of contact between the lens and the cup is reduced and the lenses will have less of a tendency to adhere to the cup when wet. The closed ends of the cups are also provided with a plurality of small openings 31 through which solution can pass as is later explained. Three recesses are formed on the periphery of the upper disc. The bottom surface of disc 21 can be provided with intaglio indicia 42 such as the letters "L" and "R" to distinguish the two lens cups. The lower disc is provided with an oval opening 43 with its shorter axis equal to or slightly larger than the diameter of the cup. The longer length facilitates the insertion or removal of a contact lens from an underlying cup. The upper disc is provided with two sets of openings 45 through which solution can pass. The sets of openings 45 line up with the two lens cups when the bottom disc 23 is in the closed position. When the cups are closed, the relationship of the upper and lower discs is that shown in FIGURE 2, i.e., both of the lens cups are covered and in this position the openings 45 in the lower disc correspond in position with the lens cups so that solution can pass through both the upper and lower discs and the lens cups and the indicia 42 are exposed to view. If one now grasps the lower disc 23 and turns it to the left, the parts can be brought to the position shown in FIGURE 4 where one of the lens cups has been opened. Obviously, if the disc were turned in the opposite direction, the right lens cup would be opened. Although the recess is shown on the upper disc and the detent on the lower, it will be apparent to those skilled in the art that the parts could be reversed or that other well known detent means could be employed.

The structure thus far described is substantially that shown in our Patent 3,139,098, and we will now describe the modifications of this device in accordance with the present invention. In order to prevent injury to the lenses, a plurality of ridges 50 are provided on the otherwise flat or lower section 23 of the composite piston 19. These ridges comprise a series of segments of circles which are coaxial with the axis of rotation of the section 23 with respect to the segment 21. They can embrace the entire surface of the piston except for that portion occupied by the opening 43, although it is not necessary that they extend much beyond the lens cups when the composite piston is in the closed position. Thus, one or all of the ridges can terminate short of the opening as is shown in FIG. 6. Preferably, these ridges are three in number, although under certain conditions, two ridges might be used or a number greater than three might be used. It will be seen that the ridges partly obstruct the openings 45 but the obstruction of these openings is not sufficient to cause any loss in the performance of the device. The edges of the lens cups have slots 52 therein, corresponding in number and placement to the ridges 50. As the section 23 is rotated, the ridges 50 will ride in the slots 52 of the lens cups. In the embodiment of the invention shown wherein the lens cups are provided with a lip 26, the slot 52 need only be placed in the lip. However, if no lip is used on the lens cup, then, of course, it would be necessary to extend the slots into the surface of the piston proper.

The exact functioning of the ridges and slots can be seen in FIGS. 3 and 7. Referring specifically to FIG. 3, it will be noted that a contact lens shown in phantom at 54 rides on the surface of the ridges 50 and is thus held out of contact with the otherwise flat surface of the piston. Thus, as one rotates the section 23, the lens will be carried on the edges of the ridges, as is shown, and as rotation is continued, the edge of the lens will strike against the wall of the lens cup 27 and will ride along the ridges as rotation is continued. In this manner, it is impossible for the edge of the lens to wedge into the space between the two sections of the piston.

In use, the cap 7 is unscrewed from the cup 5 and the cup filled with a suitable solution up to the filling line 6. The top assembly is inverted and the handle 17 is of such size and configuration that the assembly will stay upright when placed on a table or similar surface. The section 23 will then be turned to the right or to the left, opening one of the lens cups whereupon a lens can be placed in the cup. The section is then rotated in the opposite direction opening the other cup and the other lens placed in that cup. The section 23 is then turned to the closed position. The device is then re-assembled and the plunger worked up and down a number of times to thoroughly clean the lenses. Since the area of the piston is quite large when compared with the area of the apertures through which the solution can pass, it is obvious a high-speed jet action will be applied to the surface of the lenses to thoroughly clean them. After the lenses are cleaned the device is disassembled and the lenses removed utilizing the same procedure which was used in placing the lenses in the cleaning device.

It is believed obvious that many variations can be made in the exact structure shown without departing from the spirit of our invention.

We claim:

1. In a lens washing device wherein said device comprises a tubular container adapted to receive a cleansing solution, a composite perforated piston having two mating disks in substantially face-to-face contact fitting within said container, the first of which disks has a plurality of lens cups therein, each of which is adapted to hold a contact lens and an opposite, substantially flat second disk designed to lie against the first disk and rotate relative thereto while holding the lenses within the cups, the improvement comprising a plurality of concentric ridges on the second disk, said ridges fitting into mating grooves in the lips of the lens cups and thus extending into the lens cups.

2. The structure of claim 1 wherein three mating ridges and mating grooves are provided for each lens cup.

No references cited.

CHARLES A. WILLMUTH, *Primary Examiner.*

R. L. BLEUTGE, *Examiner.*